June 10, 1924.

J. A. GREEN

DIAL INDICATOR

Filed July 30, 1923    2 Sheets-Sheet 1

1,497,372

Inventor
Joseph A. Green
By James R. Hodder
Attorney

June 10, 1924.
J. A. GREEN
DIAL INDICATOR
Filed July 30, 1923    2 Sheets-Sheet 2
1,497,372
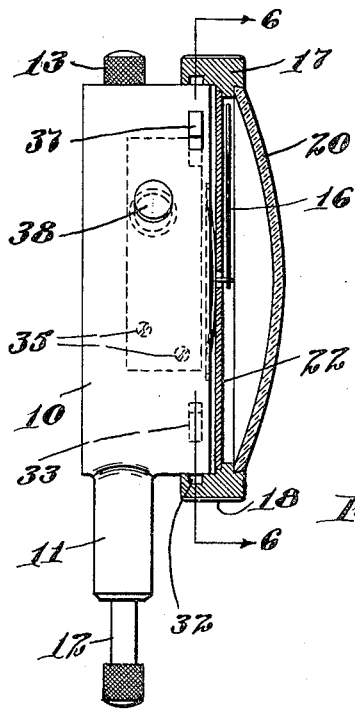
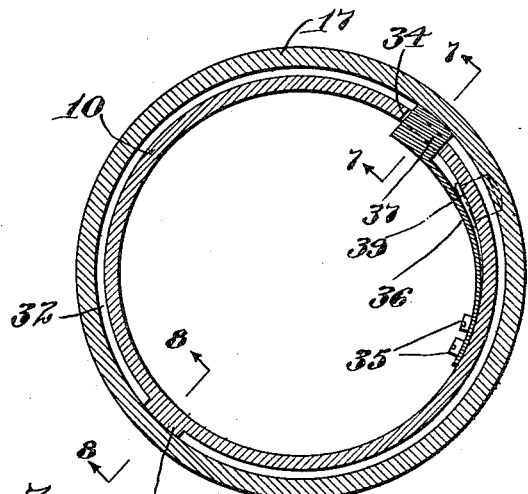
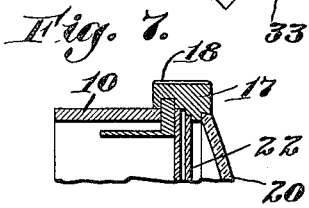
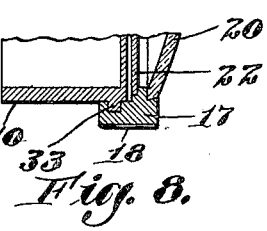
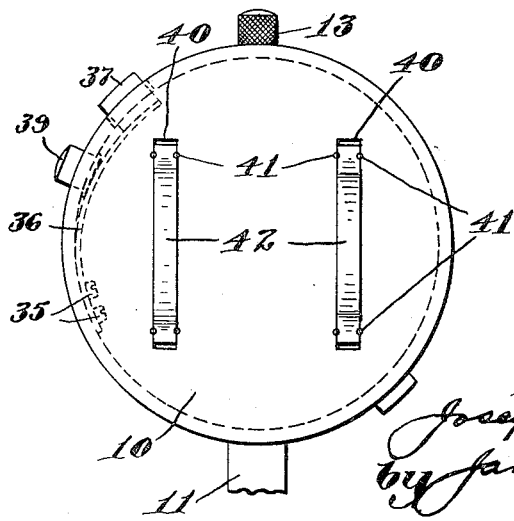
Inventor
Joseph A. Green
by James R. Hodder
Attorney Patented June 10, 1924.

1,497,372

UNITED STATES PATENT OFFICE.

JOSEPH A. GREEN, OF PROVIDENCE, RHODE ISLAND, ASSIGNOR TO FEDERAL PRODUCTS CORPORATION, OF PROVIDENCE, RHODE ISLAND, A CORPORATION OF RHODE ISLAND.

DIAL INDICATOR.

Application filed July 30, 1923. Serial No. 654,604.

*To all whom it may concern:*

Be it known that I, JOSEPH A. GREEN, a citizen of the United States, and a resident of Providence, in the county of Providence and State of Rhode Island, have invented an Improvement in Dial Indicators, of which the following description, in connection with the accompanying drawings, is a specification, like letters on the drawings representing like parts.

My present invention relates to indicating devices, and more particularly to an improved dial indicator.

In indicating devices, and particularly in indicating devices of the dial type, it has heretofore been extremely difficult to bring the zero indication on the dial in registry with the indicating hand attached to the operating movement. Where the indicating device is of a delicate character, and where the moving parts of the indicating movement, such as the staff on which the indicating hand is mounted, are extremely small and delicate it has been heretofore extremely difficult to even bring the zero indicator on the dial and the indicating hand into approximate relationship. In assembling an indicating instrument of this type, it has heretofore been usual to place the movement in an enclosing casing, place the dial in position on the open end of the enclosing casing, and then put the indicating hand onto the staff of the movement, which staff protrudes through a centrally located perforation in the dial, and before forcing the indicating hand into final position on the staff, bring such indicating hand into registry with the zero indication on the dial. As a factory operation, this operation has been an extremely difficult one to perform, even approximately correct, and as all indicating instruments are liable to derangement from various causes, it is necessary periodically to readjust the indicating hand with respect to the dial. Due to the delicate character of the instrument, it is impossible for the ordinary layman to successfully perform the adjusting operation and the indicating instrument has invariably had to be sent back to the factory for readjustment.

With a view to obviating the objections in prior structures and rendering it possible, not only to quickly and accurately adjust the indicating hand with respect to the zero indication on the dial, but also to enable the ordinary layman to successfully and accurately readjust his instrument, I have devised the subject matter of the present invention and have, in carrying out my invention, arranged the dial in fixed position with respect to a rotatable bezel and have provided such dial with a radial slot through which the indicating hand that is permanently attached to the staff of the movement may be inserted. I have also provided means by which the dial, being rotatable with the bezel, may be locked in any adjusted position.

In indicating instruments wherein the bezel is rotatable with respect to the enclosing casing and where no screw threads are employed to secure the bezel and casing together, difficulty is experienced in holding the bezel and casing in fixed relation to each other. I have overcome this difficulty by providing a plurality of spring tensioning devices on the front or top face of the casing, such tensioning devices engaging with the under face of the graduated dial and preventing relative movement of the bezel and casing when the instrument is subjected to vibration.

The principal object of my invention, therefore, is an improved combined dial plate and bezel for dial indicating instruments and the like.

Another object of my invention is an improved means for locking the rotatable bezel with attached dial in position on an indicating movement enclosing casing.

A further object of my invention is an improved tensioning means between the bezel and casing.

In the accompanying drawings illustrating the preferred embodiment of my invention as applied to a dial indicating instrument, Fig. 1 is a front elevation;
Fig. 2 is a vertical expanded side elevation of Fig. 1 with the combined dial and bezel in section;
Fig. 3 is a front elevation of my improved dial;
Fig. 4 is a fragmentary plan view on the line 4—4 of Fig. 2;
Fig. 5 is a side elevation, partly in section, of my improved device;
Fig. 6 is a sectional front elevation taken on the line 6—6 of Fig. 5;

Fig. 7 is a fragmentary section on the line 7—7 of Fig. 6;

Fig. 8 is a fragmentary section on the line 8—8 of Fig. 6, and

Fig. 9 is a front elevation of the casing.

Figure 3:
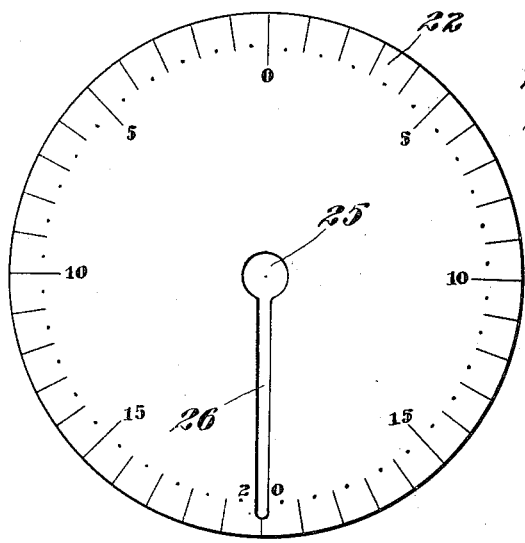

Referring to the drawings, 10 designates an indicating movement enclosing case provided with a downwardly extending sleeve 11 formed integral therewith and in which sleeve is rotatably mounted the vertical shaft 12, a bearing 13 being provided on the top of the casing 10 for adjusting the shaft 12. The indicating movement (not shown) is secured in the usual manner within the casing 10 and is connected to the shaft 12, and forming part of such indicating movement and extending outwardly to the left beyond the limits of the casing 10 is a staff 15 on the outer end of which is secured the hub of an indicating hand 16.

17 designates a bezel knurled on its outer edge at 18 and provided on its inner circumference with a stop or ledge 19 against which fits the dial cover 20 of glass or other suitable transparent material. Intermediate the ends of the bezel 17 is a spacing ring 21 formed integral with the bezel and forming a seat for a graduated dial plate 22 which is held permanently in position in the bezel by staking or in any other suitable manner.

Figure 2:
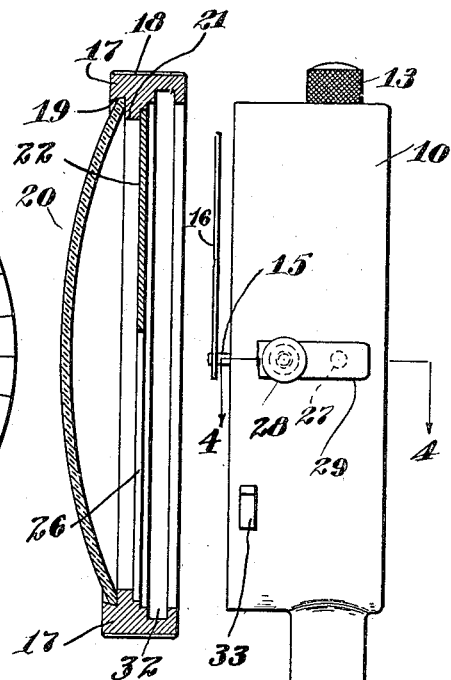
Figure 1:
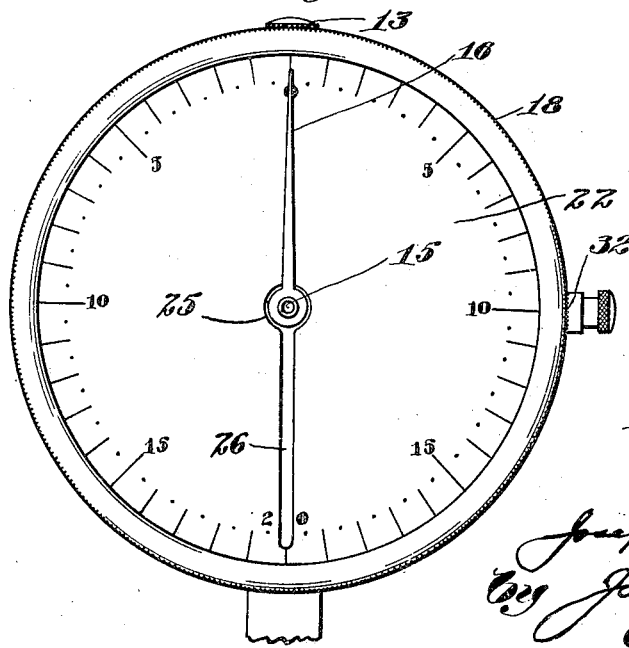
Figure 4:
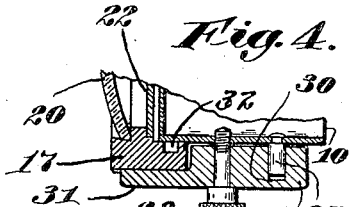

The bezel is provided with a circular groove 32 of suitable width and depth, for a purpose to be hereinafter described. The distance from the top (or left hand face, as viewed in Fig. 2) of the body 10 to the bottom (or right hand edge, as viewed in Fig. 2) of the pointer or indicator hand 16 is greater than the thickness of the dial plate 22, so that, when the bezel is assembled on the body the indicator may be free to revolve.

The dial plate 22 is provided with a centrally located perforation 25 slightly greater in diameter than the hub of the indicating hand 16 and also with a radially extending slot 26 that communicates with the perforations 25 and is of a length slightly greater than the length of the indicating hand 16.

The enclosing casing 10 has provided thereon and therein and diametrically with respect to each other a projection 33 and a slot 34, the projection 33 being of a thickness to allow it to be readily inserted in the circular groove 32 of the bezel, as clearly shown in Fig. 8. Secured to the inner face of the cylindrical body of the casing 10 by screws 35 is a resilient member 36 which has formed integral therewith on its free end a projection 37 which is of substantially the same thickness as the projection 33 and is a free sliding fit in the slot 34. The side wall of the enclosing casing 10 is perforated to allow free passage of the major portion of a push button 38 the inner end of which is enlarged at 39 to prevent such button being forced entirely through the perforation and the enlarged end 39 engages with the resilient member 36. It will be obvious, from the above, that, if the push button 38 is operated to force the resilient member 36 inward with respect to the enclosing casing 10 about the screws 35 as a pivot, the projection 37 will be forced inward through the hole or recess 34 until its outer end is withdrawn from engagement with the groove 32 in the bezel thereby making it possible for the operator to swing the bezel and associated elements about the projection 33 as a pivot when the bezel may be removed from the casing. When it is desired to remove the bezel on the enclosing casing 10, the above sequence is, of course, reversed; that is, the projection 33 is engaged in the groove 32, pressure applied to the push button 38 until the outer end of the projection 37 is within the outer periphery of the casing 10, when the bezel 17 may be forced downward into position and the push button 38 released. When this release takes place, the resilient member 36 forces the outer end of the projection 34 into the circular groove 32 and the bezel is securely locked against removal on the casing 10, and in this position may be rotated in either direction at will. It is understood, of course, that in this disassembling and assembling operation the indicating hand 16 is brought into registry with the radial slot 26 in the dial plate 22 and it will be obvious, therefore, that the indicating hand or pointer 16, having once been placed in position on the staff 15, need not be disturbed during the life of the instrument as the bezel may be removed and replaced at will.

In order to maintain the bezel 17 and attached graduated dial 22 in the position to which it may have been adjusted and to insure that this adjustment may not be disturbed, except as desired by the operator, I provide in the wall of the casing 10 and extending outwardly therefrom a stud 27 which is a sliding fit in a hole 30 in a member 29, this member 29 being also provided with a portion 31 that extends parallel to the side wall of the casing 10 and is adapted to engage with the knurling 18 on the bezel 17. This member 29 is drilled to receive a thumb screw 28, the inner end of which is threaded into the wall of the casing 10. By screwing down on the thumb screw 28, the portion 31 of the member 29 is forced into engagement with the knurling on the periphery of the bezel 17 and said bezel 17 with all attached and associated elements is retained positively in its adjusted position.

As there is apt to be a certain difference in the width or thickness of the projections 33 and 37 and the width of the groove 32, and as this difference is apt to cause looseness between the bezel and the enclosing casing 10, I have provided in the face of such enclosing casing 10 nearest the graduated dial plate 22 and on each side of the central longitudinal axis of such casing elongated grooves 40 in each of which is staked, as indicated at 41, a flat spring member 42 which extends upwardly or outwardly from the face of the enclosing casing 10 in a manner to be engaged by the end of the ungraduated surface of the dial plate 22 so that there is always a tendency for the bezel and enclosing casing to be moved apart from each other, thereby bringing the projections 33 and 37 into engagement with one edge of the circular groove 32.

It will be obvious, from the above, that no particular degree of skill is required to adjust an indicating instrument manufactured according to my invention and that the indicating hand 16 may be placed in any desired position on the staff 15 and that the bezel ring dial plate and cover plate may be assembled as above described as a unit and the parts adjusted by relatively unskilled labor, this adjustment being both accurately and quickly made. Further, it will be obvious that, while I have necessarily shown and described the preferred embodiment of my invention somewhat in detail, it is to be understood that I may vary the size, shape, and arrangement of parts within wide limits without departing from the spirit of the invention.

Having thus described my invention, what I claim as new is:

1. An improved dial indicating instrument comprising an enclosing casing having an indicating movement enclosed therein, a staff forming part of said movement and having one end extending outwardly beyond the limits of the enclosing casing, an indicating hand rigidly secured to said staff, a bezel ring, a dial plate provided with a radial slot rigidly secured in said ring, cooperating means on the enclosing casing and ring for securing the ring in position on the casing, and locking means on the casing and engaging the bezel ring for holding said bezel ring in adjusted position on the casing.

2. An improved dial indicating instrument comprising an enclosing casing for an indicating movement, a staff forming part of said movement having one end extending outward beyond the limits of the casing, an indicating hand rigidly secured to the staff, a bezel ring, cooperating means on the bezel ring and on the enclosing casing for securing said ring and casing together, a graduated dial plate rigidly secured in position in the bezel ring, and means in said dial permitting the assembling of the bezel ring with its associated dial plate on the enclosing casing without disturbing the relation of the indicating hand and the staff, said associated means on the ring and casing permitting adjustment of the indications on the dial with respect to the indicating hand.

3. An improved dial indicating instrument comprising an enclosing casing for an indicating movement, a staff forming part of said movement having one end extending outward beyond the limits of the casing, an indicating hand rigidly secured to the staff, a bezel ring, cooperating means on the bezel ring and on the enclosing casing for securing said ring and casing together, a graduated dial plate rigidly secured in position in the bezel ring, means in said dial permitting the assembling of the bezel ring with its associated dial plate on the enclosing casing without disturbing the relation of the indicating hand and the staff, said associated means on the ring and casing permitting adjustment of the indications on the dial with respect to the indicating hand, and means for adjustably holding the bezel ring and dial in position on the casing.

In testimony whereof, I have signed my name to this specification.

JOSEPH A. GREEN.